US009401062B2

(12) United States Patent
Koide

(10) Patent No.: US 9,401,062 B2
(45) Date of Patent: Jul. 26, 2016

(54) AUTOMATIC TRANSACTION DEVICE AND AUTOMATIC TRANSACTION METHOD

(71) Applicant: Oki Electric Industry Co., Ltd., Tokyo (JP)

(72) Inventor: Masaichi Koide, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 14/404,379

(22) PCT Filed: May 10, 2013

(86) PCT No.: PCT/JP2013/063190
§ 371 (c)(1),
(2) Date: Nov. 26, 2014

(87) PCT Pub. No.: WO2013/183397
PCT Pub. Date: Dec. 12, 2013

(65) Prior Publication Data

US 2015/0112479 A1 Apr. 23, 2015

(30) Foreign Application Priority Data

Jun. 5, 2012 (JP) ................................ 2012-127995

(51) Int. Cl.
*G06Q 40/00* (2012.01)
*G07F 19/00* (2006.01)
*G07D 11/00* (2006.01)

(52) U.S. Cl.
CPC ........ *G07D 11/0042* (2013.01); *G07D 11/0018* (2013.01); *G07D 11/0063* (2013.01); *G07F 19/203* (2013.01); *G07F 19/209* (2013.01)

(58) Field of Classification Search
USPC ...................... 235/379, 381, 383; 705/39–45
See application file for complete search history.

(56) References Cited

U.S. PATENT DOCUMENTS 4,340,150 A * 7/1982 Guibord ................ G07F 19/202 194/210
6,176,423 B1 * 1/2001 Egami .......................... 235/379
(Continued)

FOREIGN PATENT DOCUMENTS

CN 101393670 A 3/2009
CN 102222385 A 10/2011
(Continued)

OTHER PUBLICATIONS

Chinese Office Action dated Feb. 2, 2016, with partial translation.

*Primary Examiner* — Tuyen K Vo
(74) *Attorney, Agent, or Firm* — Rabin & Berdo, P.C.

(57) ABSTRACT

The objective of the present invention is to provide an automatic transaction device capable of suppressing wasteful operation of the automatic transaction device when a shutter failure has occurred. The present invention is an automatic transaction device that performs transactions related to cash, and is characterized by including: a deposit/withdrawal slot for depositing/withdrawing cash; an opening/closing member that is capable of opening and closing the deposit/withdrawal slot by way of movement; an opened/closed detection unit that detects the opened/closed state of the opening/closing member; and a control unit that opens and closes the opening/closing member at the time of a reset operation of the automatic transaction device to perform operation verification processing, causes detection of the opened/closed state of the opening/closing member after the operation verification processing, and if it is determined that the opened/closed state is abnormal, aborts the transaction.

13 Claims, 10 Drawing Sheets

(56) References Cited

U.S. PATENT DOCUMENTS

| | | | | |
|---|---|---|---|---|
| 6,398,108 | B1 * | 6/2002 | Swinton et al. | 235/379 |
| 6,805,285 | B2 * | 10/2004 | Peebles et al. | 235/379 |
| 2003/0116621 | A1 * | 6/2003 | Duncan | G07F 19/20 235/379 |
| 2004/0011622 | A1 * | 1/2004 | Omori | G07D 11/0054 194/230 |
| 2004/0141058 | A1 * | 7/2004 | Ramachandran | G07F 19/20 348/150 |
| 2004/0164141 | A1 * | 8/2004 | Egami et al. | 235/379 |
| 2005/0258236 | A1 * | 11/2005 | Boyes et al. | 235/379 |
| 2007/0105610 | A1 * | 5/2007 | Anderson | G07F 17/32 463/16 |
| 2007/0138256 | A1 * | 6/2007 | Coventry | 235/379 |
| 2008/0136657 | A1 * | 6/2008 | Clark et al. | 340/686.6 |
| 2012/0097700 | A1 * | 4/2012 | Ito | G07F 19/203 221/258 |

FOREIGN PATENT DOCUMENTS

| | | | |
|---|---|---|---|
| JP | H09-128595 | A | 5/1997 |
| JP | H09-212719 | A | 8/1997 |
| JP | 2006-313398 | A | 11/2006 |
| JP | 2008-097241 | A | 4/2008 |

* cited by examiner

AUTOMATIC TRANSACTION DEVICE AND AUTOMATIC TRANSACTION METHOD

TECHNICAL FIELD

The present invention relates to an automatic transaction device and an automatic transaction method.

BACKGROUND ART

Automatic transaction devices, that are exemplified by ATMs (Automated teller machines) of financial institutions, are set in a branch of a financial institution such as a bank or the like, or in a store such as a convenience store or the like. A customer can carry out transactions such as deposits, withdrawals, balance inquiries, and the like by carrying out various types of operations at a display screen that is displayed on the automatic transaction device.

The automatic transaction device has a transfer opening (also called a customer interface opening) for carrying out transfer of cash (e.g., bills) with customers. Further, a shutter that can open and close is provided at the transfer opening. The shutter is usually closed, but, due to the shutter opening at the time when cash is transferred to/from a customer, the customer can insert cash into the transfer opening or can receive cash from the transfer opening.

By the way, during the initialization of the operation of resetting the automatic transaction device or the like, the shutter is maintained in a closed state, and confirmation of operation of the shutter is not carried out. This is because, when a resetting operation is carried out by remote control or automatically and the shutter is opened and closed, there is the concern that a person in front of the automatic transaction device will make a dishonest transaction by tampering or the like.

Therefore, a measure to prevent dishonest transactions by carrying out checking of the state of the shutter at the time of dispensing has been employed conventionally (see, for example, Japanese Patent Application Laid-Open (JP-A) No. 2006-313398, JP-A No. 2008-97241).

DISCLOSURE OF INVENTION

Technical Problem

However, with the above-described measure, if the automatic transaction device is restored by a resetting operation in a state in which trouble has arisen at the shutter, there is the concern that there will be trouble with the transaction following that and that the automatic transaction device will be operated uselessly.

Thus, the present invention was made in consideration of the above-described problem, and an object of the present invention is to provide a novel and improved automatic transaction device at which useless operation of the automatic transaction device at the time when trouble arises at the shutter can be suppressed.

Solution to Problem

In order to overcome the above-described problem, in accordance with a certain aspect of the present invention, there is provided an automatic transaction device that carries out transactions relating to cash, including: a transfer opening at which transfer of cash is carried out; an opening/closing member that, by moving, can open and close the transfer opening; an opened/closed sensing section that senses an open/closed state of the opening/closing member; and a control section that, at a time of a resetting operation of the automatic transaction device, opens and closes the opening/closing member and carries out operation confirmation processing, and, after the operation confirmation processing, causes the open/closed state of the opening/closing member to be sensed, and, if it is judged that the open/closed state is abnormal, continues a cancelled state of the transaction.

In accordance with this automatic transaction device, at the time of a resetting operation, the control section opens and closes the opening/closing member and carries out operation confirmation processing, and, after the operation confirmation processing, causes the open/closed state of the opening/closing member to be sensed, and, if it is judged that the open/closed state is abnormal, continues the cancelled state of the transaction. Due thereto, by opening and closing the opening/closing member not just at the time of dispensing but also at the time of the resetting operation, the state of the opening/closing member can be sensed properly, and therefore, the automatic transaction device can be prevented from being restored with the opening/closing member being in an abnormal state. As a result, useless operation of the automatic transaction device can be suppressed.

Further, it may be made such that there is further included a cash sensing section that senses cash of the transfer opening, wherein, in a case in which it is sensed that cash remains in the transfer opening, the control section does not carry out the operation confirmation processing.

Further, it may be made such that there is further included a cash processing section that takes-in, into a device interior, cash of the transfer opening, wherein the control section carries out the operation confirmation processing after taking-in of the cash into the device interior.

Further, it may be made such that there is further included an acquiring section that acquires trouble information relating to trouble that has arisen at the automatic transaction device, wherein the control section carries out the operation confirmation processing if the acquired trouble information expresses trouble with the opening/closing member, and does not carry out the operation confirmation processing if the trouble information expresses trouble other than trouble with the opening/closing member.

Further, it may be made such that there is further included a person sensing section that senses existence of a person in a vicinity of the automatic transaction device, wherein the control section does not carry out the operation confirmation processing if it is sensed that there is a person in the vicinity.

Further, it may be made such that there is further included a mode setting section that sets an operation mode of the automatic transaction device, wherein the control section carries out the operation confirmation processing if a set operation mode is a predetermined mode.

Further, it may be made such that the predetermined mode includes a mode that forcibly carries out the operation confirmation processing.

Further, it may be made such that there is further included an acquiring section that acquires a number of times of non-execution of the operation confirmation processing, wherein the predetermined mode includes a mode that forcibly carries out the operation confirmation processing if the number of times of non-execution exceeds a predetermined number of times.

Further, it may be made such that the predetermined mode includes a mode that forcibly carries out the operation confirmation processing if the resetting operation has been carried out within a predetermined time that is set in advance.

Further, it may be made such that the predetermined mode includes a mode that confirms trouble with the opening/closing member.

Further, it may be made such that there is further included an acquiring section that acquires trouble information relating to trouble that has arisen at the automatic transaction device, wherein the control section gives notice of trouble with the opening/closing member if the acquired trouble information expresses trouble with the opening/closing member and the control section does not carry out the operation confirmation processing.

In order to overcome the above-described problem, in accordance with another aspect of the present invention, there is provided an automatic transaction method that carries out transactions relating to cash by an automatic transaction device, the method including: a step of, at a time of a resetting operation of the automatic transaction device, opening and closing an opening/closing member that can open and close a transfer opening at which transfer of cash is carried out, and carrying out operation confirmation processing; a step of sensing an open/closed state of the opening/closing member after the operation confirmation processing; and a step of continuing a cancelled state of the transaction if it is judged that the open/closed state is abnormal.

Advantageous Effects of Invention

As described above, in accordance with the present invention, useless operation of an automatic transaction device at the time when trouble arises at a shutter can be suppressed.

BEST MODES FOR CARRYING OUT THE INVENTION

Figure 1:
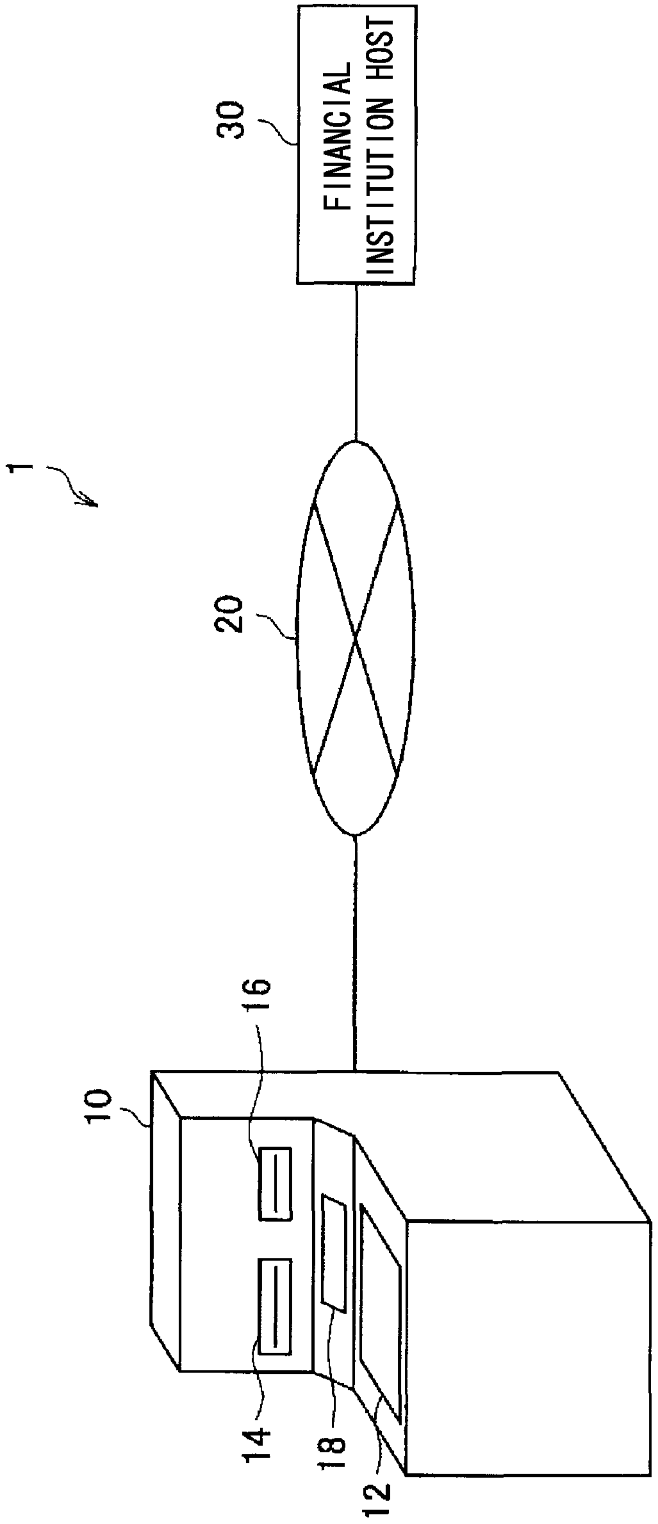
FIG. 1 is a drawing for explaining the schematic structure of an automatic transaction system relating to a first embodiment.

Preferred embodiments of the present invention are described in detail hereinafter with reference to the appended drawings. Note that, in the present specification and drawings, repeat description of structural elements having substantially the same functional structures is omitted by denoting such elements by the same reference numerals.

1. First Embodiment

1-1. Summary of Automatic Transaction System

A summary of an automatic transaction system 1 relating to a first embodiment is described with reference to FIG. 1.

FIG. 1 is a drawing for explaining the schematic structure of the automatic transaction system 1 relating to the first embodiment. As shown in FIG. 1, the automatic transaction system 1 has an automatic transaction device 10, a private network 20, and a financial institution host 30.

The automatic transaction device 10 is a customer-operated terminal that executes cash transactions on the basis of operations by a customer of the financial institution. The automatic transaction device 10 is set within various facilities such as, for example, an office of the financial institution, a convenience store, a station, or the like.

The automatic transaction device 10 has a customer operation/display portion 12, a passbook insertion opening 14, a card insertion opening 16, and a customer interface opening 18 that is an example of a transfer opening. The customer operation/display portion 12 functions as a display portion that displays screens that guide operations of the customer, and as a customer operation portion that detects operations of the customer. The function as a display portion is realized by, for example, a liquid crystal display device or the like. The function as a customer operation portion is realized by, for example, a touch panel.

Figure 2:
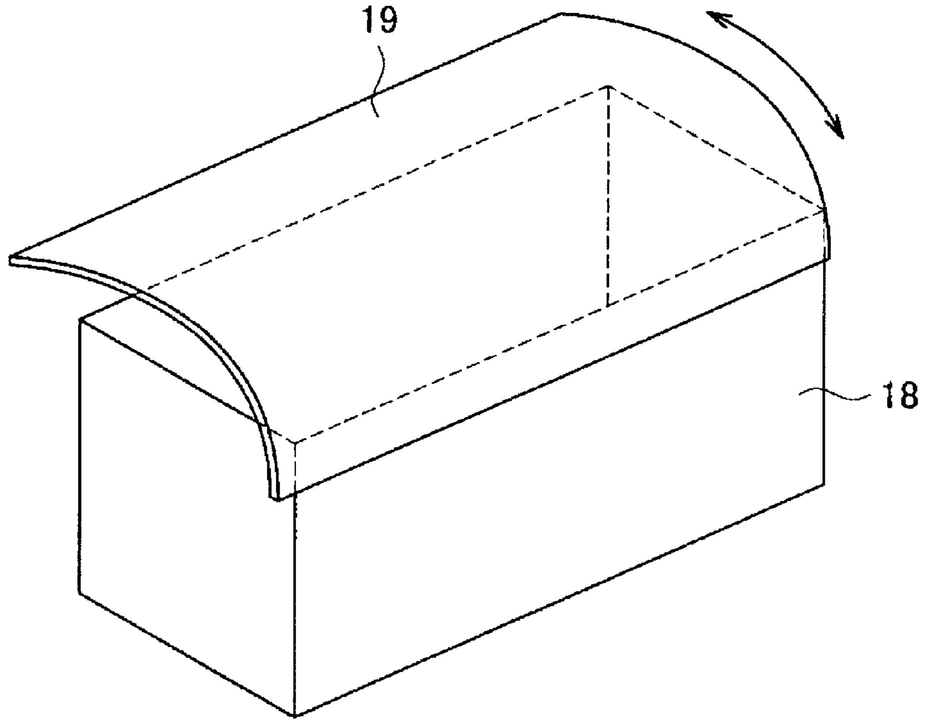
FIG. 2 is a schematic drawing showing an example of the structure of a shutter 19.

The passbook insertion opening 14 carries out inserting and discharging of the passbook of the customer. The card insertion opening 16 carries out inserting and discharging of a cash card of the customer. The customer interface opening 18 is an opening at which transfer of cash to and from the customer is carried out, and functions as a deposit opening for bills by the customer, and a dispensing opening for bills to the customer. Further, as shown in FIG. 2, a shutter 19, that is an example of an opening/closing member that can open and close, is provided at the upper portion of the customer interface opening 18. The shutter 19, by moving, closes or opens the customer interface opening 18. Here, as shown in FIG. 2, a shutter that is shaped as a curved surface may open and close by rotating, or, a shutter that is planar may open and close by being slid. FIG. 2 is a schematic drawing showing an example of the structure of the shutter 19. Further, in the above description, the customer interface opening 18 is opened or closed due to the shutter 19 moving. However, the present embodiment is not limited to this, and the customer interface opening may be opened and closed by, for example, rotating a customer interface drum that is cylindrical and in which the customer interface opening is formed. In this case, a shutter is not needed.

The private network 20 is a network of the financial institution, and is structured by, for example, an IP-VPN (Internet Protocol-Virtual Private Network). The automatic transaction device 10 can communicate with the financial institution host 30 via the private network 20.

The financial institution host 30 controls respective types of transactions by communicating with the automatic transaction device 10 via the private network 20. For example, the financial institution host 30 carries out verification of the customer who operates the automatic transaction device 10, and executes monetary transactions (account settlement transaction processings) such as deposits and transfers and the like that are instructed by a customer at the automatic transaction device 10. Further, the financial institution host 30 manages customer information (the ledger of the account) such as the account number, PIN, name, address, age, date of birth, phone number, occupation, family structure, income, account balance, and the like.

1-2. Example of Structure of Automatic Transaction Device

An example of the structure of the automatic transaction device 10 relating to the first embodiment is described with reference to FIG. 3.

Figure 3:
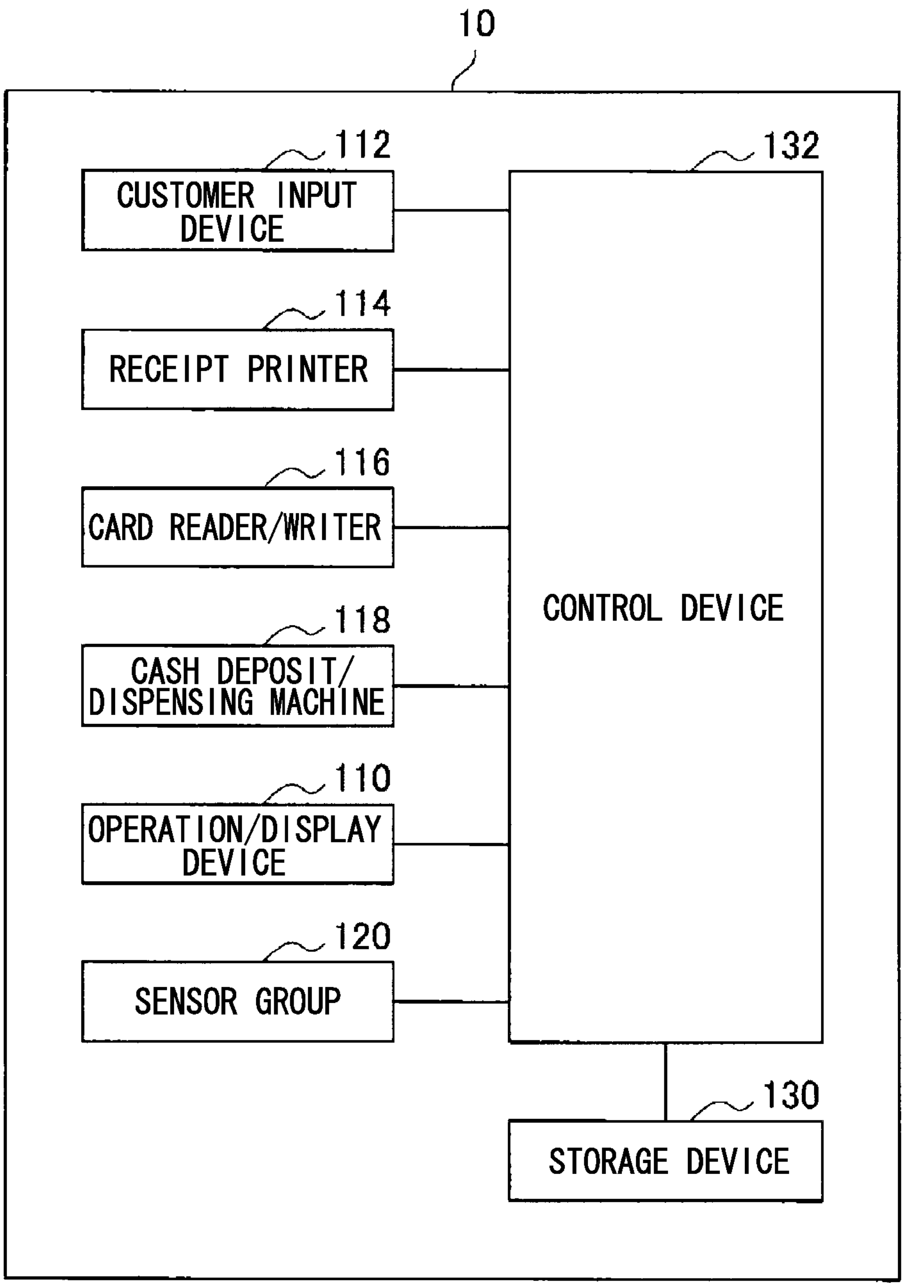
FIG. 3 is a block diagram showing an example of the structure of an automatic transaction device 10 relating to the first embodiment.

FIG. 3 is a block diagram showing an example of the structure of the automatic transaction device 10 relating to the first embodiment. As shown in FIG. 3, the automatic transaction device 10 has an operation/display device 110, a customer input device 112, a receipt printer 114, a carder reader/writer 116, a cash deposit/dispensing machine 118, a sensor group 120, a storage device 130, and a control device 132.

The operation/display device 110 is a device that functions as a display portion that displays screens that guide operations of the customer, and as a customer operation portion that detects operations of the customer. The customer input device 112 is a device for the customer to input verification information such as a PIN, and the transaction amount, and the like.

The receipt printer 114 is a printer that prints receipts. The card reader/writer 116 is a magnetic device for carrying out reading of a cash card and writing onto a cash card. The cash deposit/dispensing machine 118 carries out storing of bills that are inserted from a customer, and discharging of bills that are to be handed-over to a customer, and the like. The sensor group 120 has sensors such as infrared sensors and optical sensors and the like, and senses various states.

The storage device 130 stores programs for operation of the automatic transaction device 10, and the like. The control device 132 controls the overall operations of the automatic transaction device 10. An example of the functional structure of this control device 132 is described concretely hereinafter with reference to FIG. 4.

1-3. Example of Functional Structure of Control Device

Figure 4:
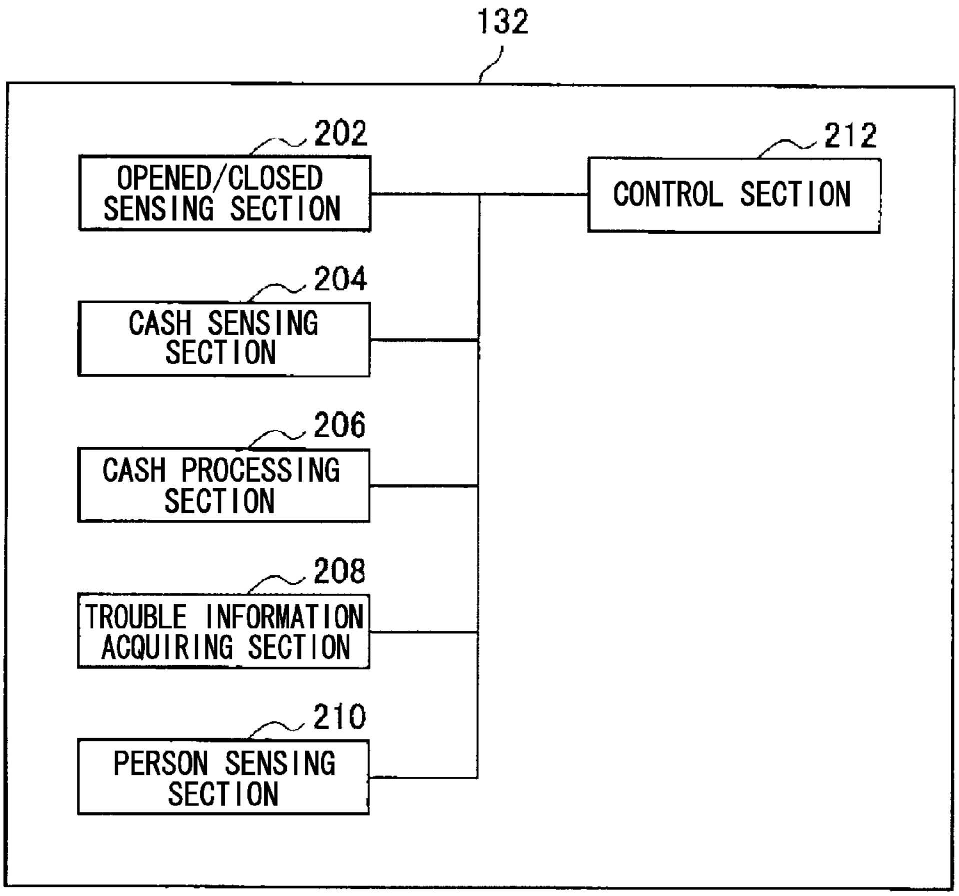
FIG. 4 is a block diagram showing an example of the functional structure of a control device 132 relating to the first embodiment.

FIG. 4 is a block diagram illustrating an example of the functional structure of the control device 132 relating to the first embodiment. As shown in FIG. 4, the control device 132 relating to the first embodiment has an opened/closed sensing section 202, a cash sensing section 204, a cash processing section 206, a trouble information acquiring section 208, a person sensing section 210, and a control section 212.

The opened/closed sensing section 202 senses the open/closed state of the shutter 19 via the sensor group 120. Due thereto, it can be sensed whether or not the shutter 19 opens and closes normally. The opened/closed sensing section 202 outputs the results of sensing of the open/closed state of the shutter 19 to the control section 212.

The cash sensing section 204 senses the existence of bills in the customer interface opening 18 via the sensor group 120. Due thereto, it can be sensed whether or not bills remain in the customer interface opening 18. The cash sensing section 204 outputs the results of sensing the existence of bills to the control section 212.

The cash processing section 206 carries out processings relating to the processing of bills. For example, the cash processing section 206 carries out the processing of taking-in, into the device interior, bills that are in the customer interface opening 18. Due thereto, the problem of bills remaining in the customer interface opening 18 can be resolved.

The trouble information acquiring section 208 acquires trouble information relating to troubles that have arisen at the automatic transaction device 10. Due thereto, troubles that have occurred at the automatic transaction device 10 can be understood. Trouble information is information that expresses, for example, trouble with the shutter 19, or trouble with other structural elements. The trouble information acquiring section 208 outputs the acquired trouble information to the control section 212.

The person sensing section 210 senses, via the sensor group 120, the existence of a person in the vicinity of the automatic transaction device 10 (e.g., in front of the customer interface opening 18). The person sensing section 210 outputs the results of sensing the existence of a person to the control section 212.

At the time of a resetting operation of the automatic transaction device 10, the control section 212 opens and closes the shutter 19 and carries out operation confirmation processing. Then, after the operation confirmation processing, the control section 212 causes the opened/closed sensing section 202 to sense the open/closed state of the shutter 19, and continues a transaction cancelled state if it is judged that the open/closed state is abnormal.

The control section 212 controls the operation confirmation processing of the shutter 19 in accordance with the state of the automatic transaction device 10. For example, in a case in which it is sensed by the cash sensing section 204 that bills remain in the customer interface opening 18, the control section 212 does not carry out operation confirmation processing of the shutter 19. Due thereto, the shutter not operating normally due to remaining bills and the operation confirmation processing not being able to be carried out properly can be prevented.

Further, the control section 212 carries out operation confirmation processing of the shutter 19 after the taking-in of bills into the device interior by the cash processing section 206. Due thereto, bills that remain in the customer interface opening 19 can be reliably cleared out.

Further, in a case in which the trouble information acquired by the trouble information acquiring section 208 expresses trouble with the shutter 19, the control section 212 carries out operation confirmation processing of the shutter 19. In a case in which the trouble information expresses trouble other than trouble with the shutter 19, the control section 212 does not carry out operation confirmation processing. If there is trouble with other than the shutter 19, there is no need to carry out confirmation of the operation of the shutter 19, and therefore, useless operation of the automatic transaction device that is caused by operating the shutter 19 can be prevented.

Further, the control section 212 does not carry out operation confirmation processing of the shutter 19 in a case in which it is sensed by the person sensing section 210 that there is a person in the vicinity of the automatic transaction device 10. Due thereto, for example, tampering by a person who is in front of the customer interface opening 18 can be prevented.

1-4. Example of Operation of Automatic Transaction Device

An example of the operation of the automatic transaction device 10 at the time of resetting processing is described next with reference to FIG. 5.

Figure 5:
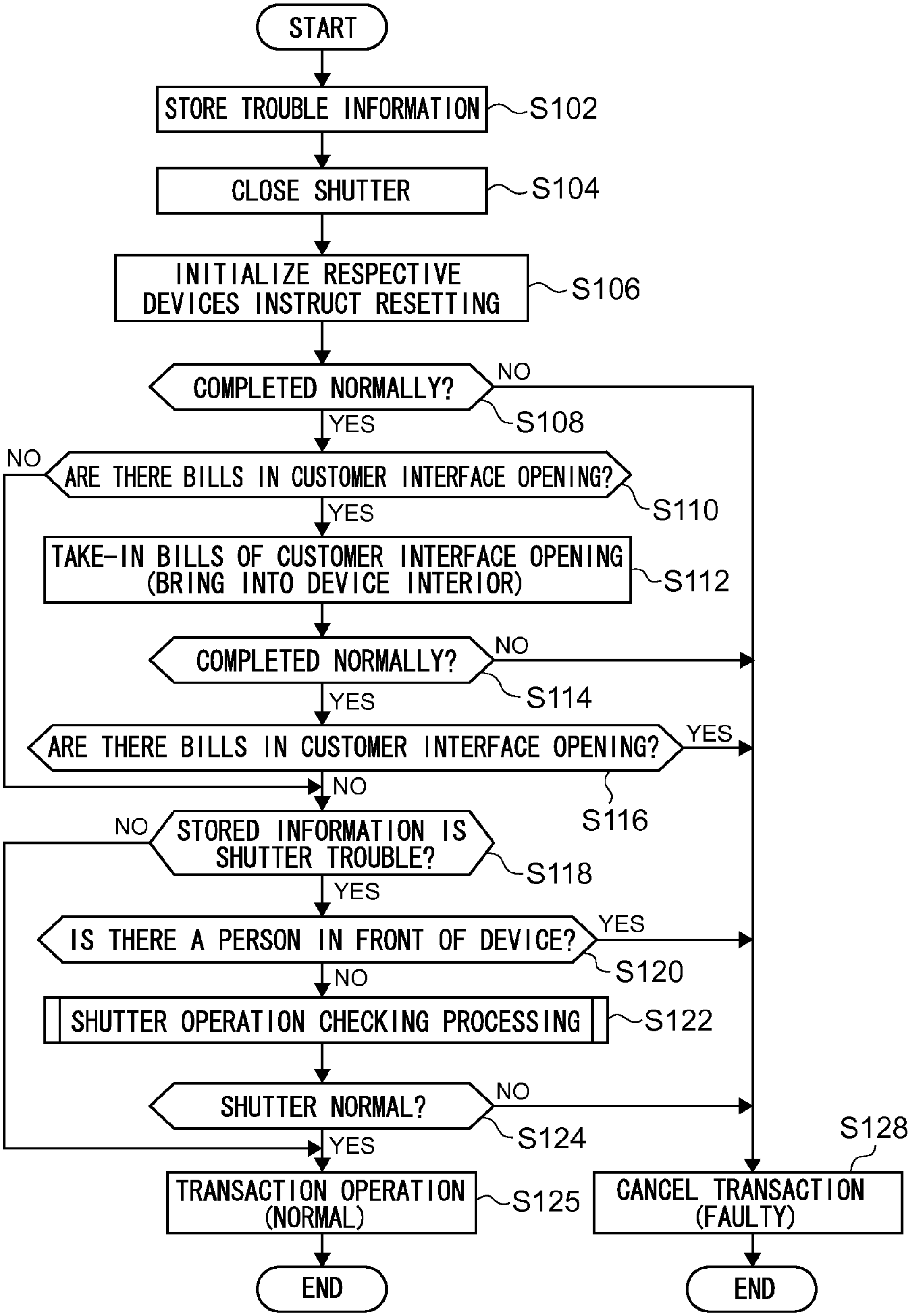
FIG. 5 is a flowchart showing an example of operation of the automatic transaction device 10 at the time of resetting processing relating to the first embodiment.

FIG. 5 is a flowchart showing an example of the operation of the automatic transaction device 10 at the time of resetting processing relating to the first embodiment. The present processing is realized due to a control device 122 executing a program that is stored in the storage device 130. Further, the flowchart of FIG. 5 starts from when trouble arises at the automatic transaction device 10.

First, the control device 122 stores the current trouble information (step S102). Next, the control device 122 sets the shutter 19 in a closed state (step S104). Then, the control device 122 instructs the respective devices, such as the cash deposit/dispensing machine 118 and the like, to initialize, and carries out the resetting operation (step S106).

Next, the control device 122 judges whether or not operation has been completed normally (step S108). If it is judged in step S108 that operation has been completed normally (Yes), the control device 122 judges whether or not bills remain in the customer interface opening 18 (step S110). On the other hand, if it is judged in step S108 that operation has not been completed normally (No), the control device 122 cancels the transaction (step S128).

If it is judged in step S110 that bills remain (Yes), the control device 122 takes-in and brings the remaining bills into the device interior (step S112). Next, the control device 122 judges whether or not the taking-in of the bills has been completed normally (step S114).

If it is judged in step S114 that the taking-in of bills has been completed normally (Yes), the control device 122 again judges whether or not bills remain in the customer interface opening 18 (step S116). Then, if it is judged in step S116 that bills do not remain (No), the control device 122 judges whether or not the trouble information that was stored in step S102 is information relating to trouble with the shutter 19 (step S118). Further, also when it is judged in step S110 that bills do not remain (No), the control device 122 carries out the processing of step S118.

On the other hand, if it is judged in step S116 that bills do remain (Yes), i.e., if bills were not taken-in normally, the control device 122 cancels the transaction (step S128). Further, also when it is judged in step S114 that the taking-in of bills has not been completed normally (No), the control device 122 cancels the transaction (step S128).

If it is judged in step S118 that the trouble information is information relating to trouble with the shutter 19 (Yes), the control device 122 judges whether or not there is a customer in front of the automatic transaction device 10 (step S120). Then, if it is judged in step S120 that there is no customer in front of the device (No), the control device 122 executes shutter operation checking processing (step S122). On the other hand, if it is judged in step S120 that there is a customer in front of the device (Yes), the control device 122 cancels the transaction (step S128).

Figure 6:
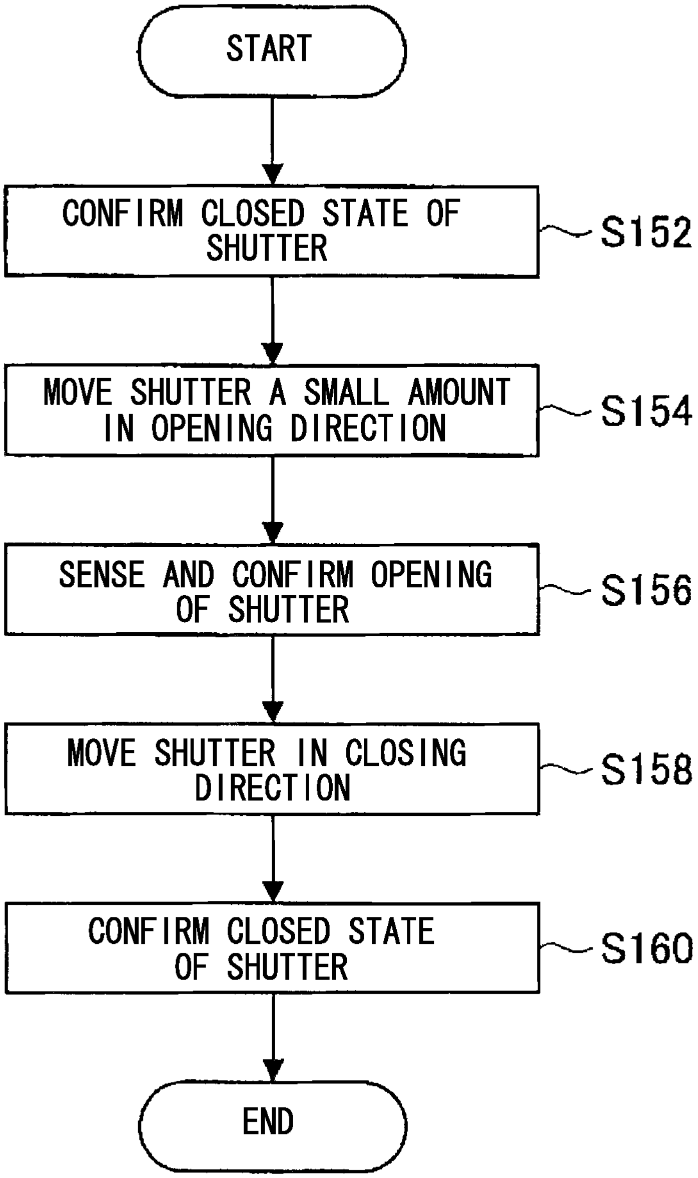
FIG. 6 is a flowchart showing shutter operation checking processing.

Shutter operation checking processing is described here with reference to FIG. 6. FIG. 6 is a flowchart showing the shutter operation checking processing. In the checking processing, first, the control device 122 confirms the closed state of the shutter 19 (step S152). Next, the control device 122 moves the shutter in the opening direction by a predetermined amount (a small amount) (step S154).

Next, the control device 122 senses whether or not the shutter 19 that has been moved has actually opened (step S156). Next, the control device 122 moves the shutter 19 in the closing direction (step S158). Next, the control device 122 senses whether or not the shutter 19 that has been moved has actually closed (step S160). Due thereto, the shutter operation checking processing of step S122 of FIG. 5 is completed.

Explanation continues by returning to the flowchart of FIG. 5. By the above-described shutter operation checking processing, the control device 122 judges whether or not opening/closing of the shutter 19 is normal (step S124).

If it is judged in step S124 that opening/closing of the shutter 19 is normal (Yes), the control device 122 judges that the shutter 19 is in a normal state, and executes the transaction (step S126). Note that, if it is judged in step S118 that the trouble information is not information relating to trouble with the shutter 19 (No), i.e., if there is trouble with other than the shutter 19, the control device 122 executes the transaction (step S126) without carrying out the checking processing of the shutter 19 (step S122).

If it is judged in step S124 that opening/closing of the shutter 19 is abnormal (No), the control device 122 judges that the faulty state of the shutter 19 has not been resolved, and cancels the transaction (step S128). The series of resetting processings relating to the first embodiment is thereby completed.

1-5. Effectiveness of Automatic Transaction Device

In accordance with the above-described first embodiment, at the time of the resetting operation, the control device 122 opens and closes the shutter 19 and carries out operation confirmation processing. Then, after the operation confirmation processing, the control device 122 causes the open/closed state of the shutter 19 to be sensed, and, if it is judged that the open/closed state is abnormal, the control device 122 continues the transaction cancelled state.

Due thereto, by opening and closing the shutter 19 not only at the time of dispensing but also at the time of the resetting operation, the state of the shutter 19 can be sensed properly, and therefore, the automatic transaction device 10 can be prevented from being restored with the shutter 19 in an abnormal state. As a result, useless operation of the automatic transaction device 10 can be suppressed.

2. Second Embodiment

2-1. Example of Functional Structure of Control Device

Figure 7:
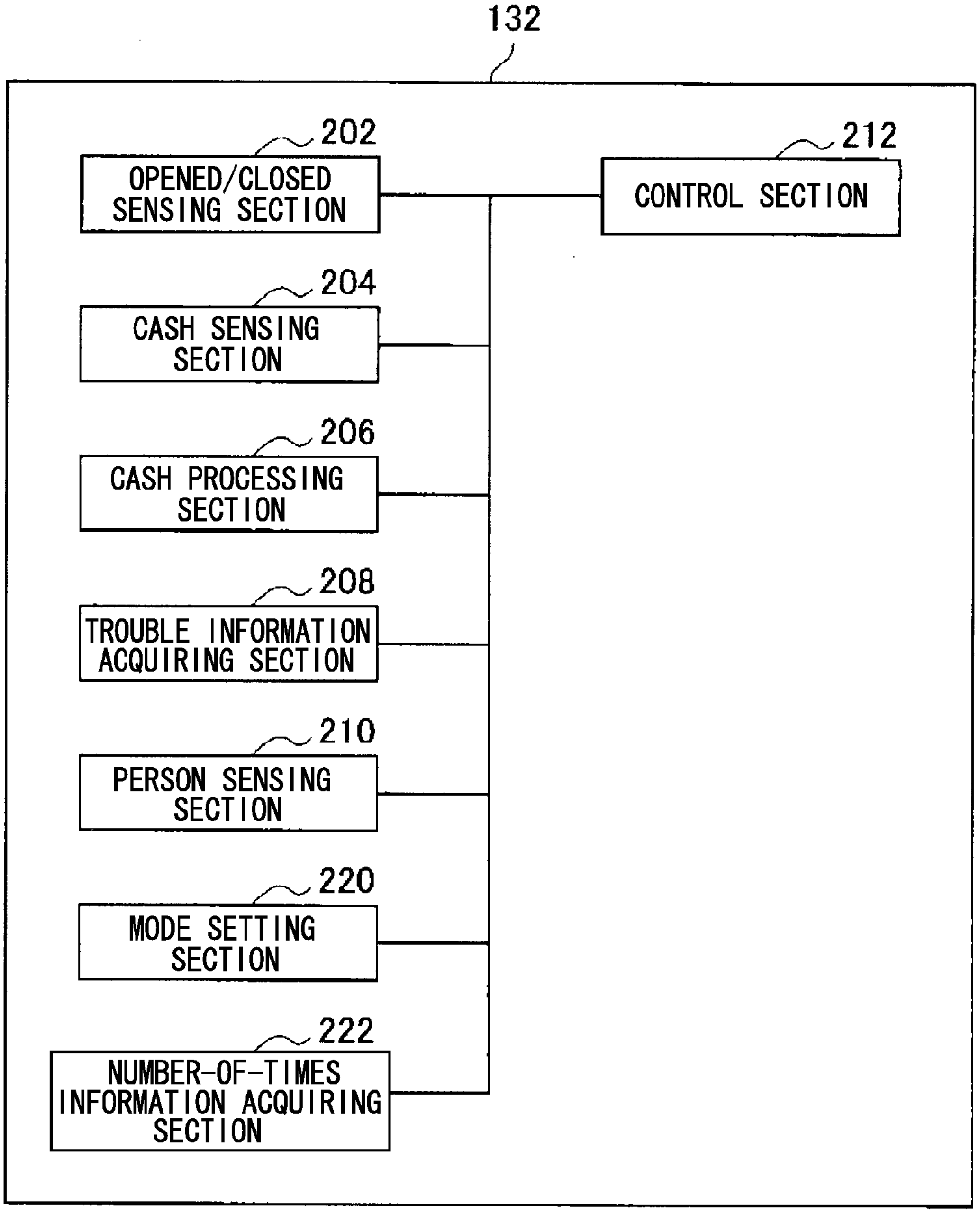
FIG. 7 is a block diagram showing an example of the functional structure of the control device 132 relating to a second embodiment.

FIG. 7 is a block diagram showing an example of the functional structure of the control device 132 relating to a second embodiment. As shown in FIG. 7, the control device 132 relating to the second embodiment has the opened/closed sensing section 202, the cash sensing section 204, the cash processing section 206, the trouble information acquiring section 208, the person sensing section 210, the control section 212, a mode setting section 220, and a number-of-times information acquiring section 222.

The opened/closed sensing section 202, the cash sensing section 204, the cash processing section 206, the trouble information acquiring section 208 and the person sensing section 210 relating to the second embodiment have functions that are similar to the first embodiment that was explained in FIG. 4, and therefore, detailed description thereof is omitted.

The mode setting section 220 sets an operation mode of the automatic transaction device 10. For example, the mode setting section 220 sets a mode, that the customer inputs (selects) from the customer input device 112, as the operation mode. The mode setting section 220 outputs information relating to the set operation mode to the control section 212.

The number-of-times information acquiring section 222 acquires the number of times of non-execution of the operation confirmation processing of the shutter 19. For example, the number-of-times information acquiring section 222 acquires the number of times of non-execution of the operation confirmation processing at the time of the resetting operation of the automatic transaction device 10. The number-of-times information acquiring section 222 outputs the information relating to the acquired number of times of non-execution to the control section 212.

The control section 212 relating to the second embodiment forcibly carries out operation confirmation processing of the shutter 19 in a case in which the operation mode set from the mode setting section 220 is a predetermined mode (concretely, is any of a first mode through a fourth mode that are described hereinafter). Due thereto, continuation of a state in which the operation confirmation processing of the shutter 19 is not carried out can be prevented.

Here, the first mode is a mode in which the operation confirmation processing of the shutter 19 is forcibly carried out invariably. The second mode is a mode in which the operation confirmation processing of the shutter 19 is forcibly carried out in a case in which the number of times of non-execution that was acquired by the number-of-times information acquiring section 222 exceeds a predetermined number-of-times. The third mode is a mode in which the operation confirmation processing of the shutter 19 is forcibly carried out in a case in which the resetting operation of the automatic transaction device 10 has been carried out within a predetermined time that is set in advance. The fourth mode is a mode in which trouble of the shutter 19 is confirmed. By using these modes, it becomes easy to carry out operation confirmation processing of the shutter 19 that corresponds to the usage situation of the device.

Further, the control section 212 gives notice that there is trouble with the shutter 19, in a case in which the trouble information acquired from the trouble information acquiring section 208 expresses trouble with the shutter 19 and the operation confirmation processing of the shutter 19 is not carried out. Due thereto, the customer can know that trouble with the shutter 19 has not been resolved.

2-2. Example of Operation of Automatic Transaction Device

Figure 8:
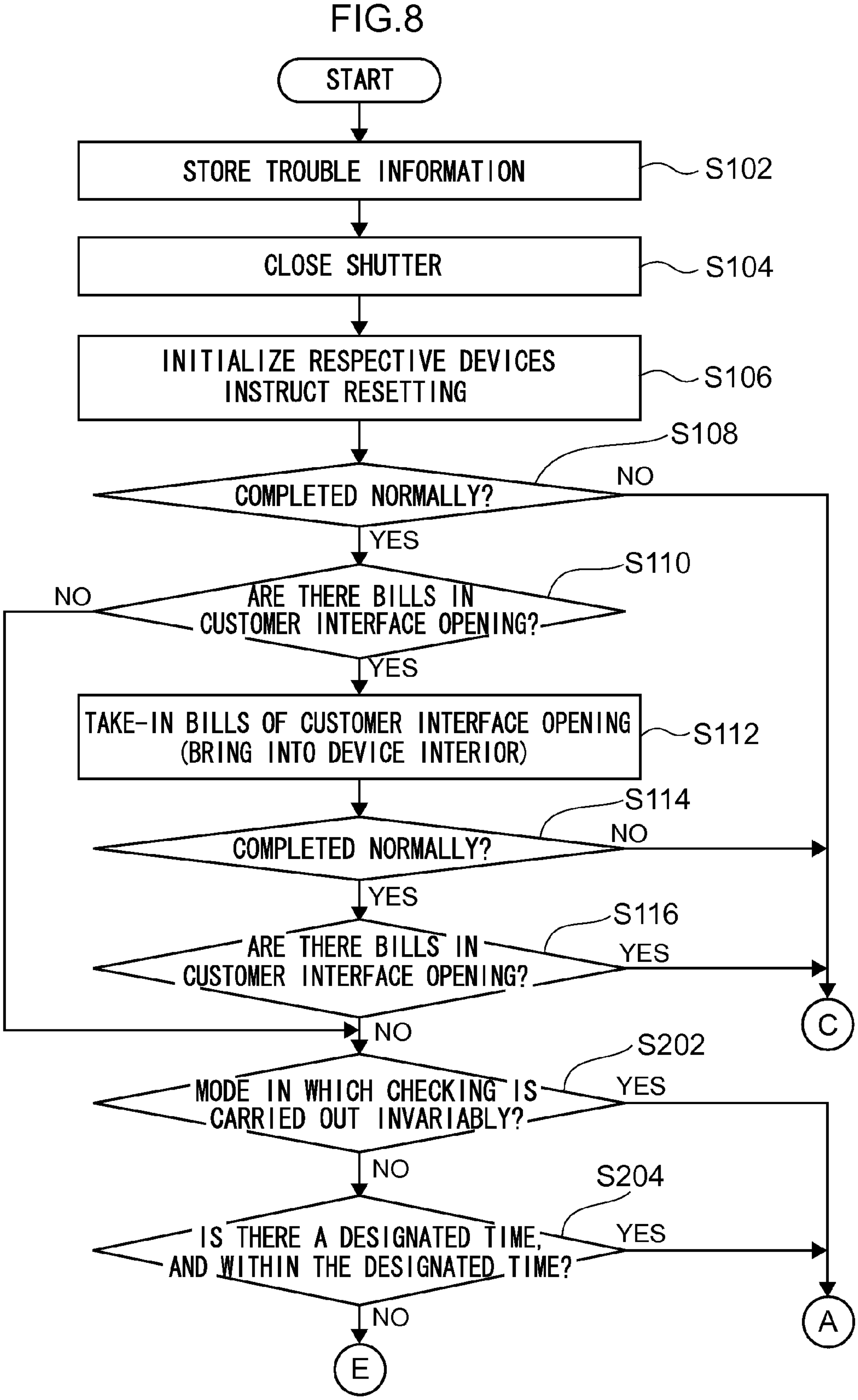
FIG. 8 is a flowchart showing an example of operation of the automatic transaction device 10 at the time of resetting processing relating to the second embodiment.
Figure 9:
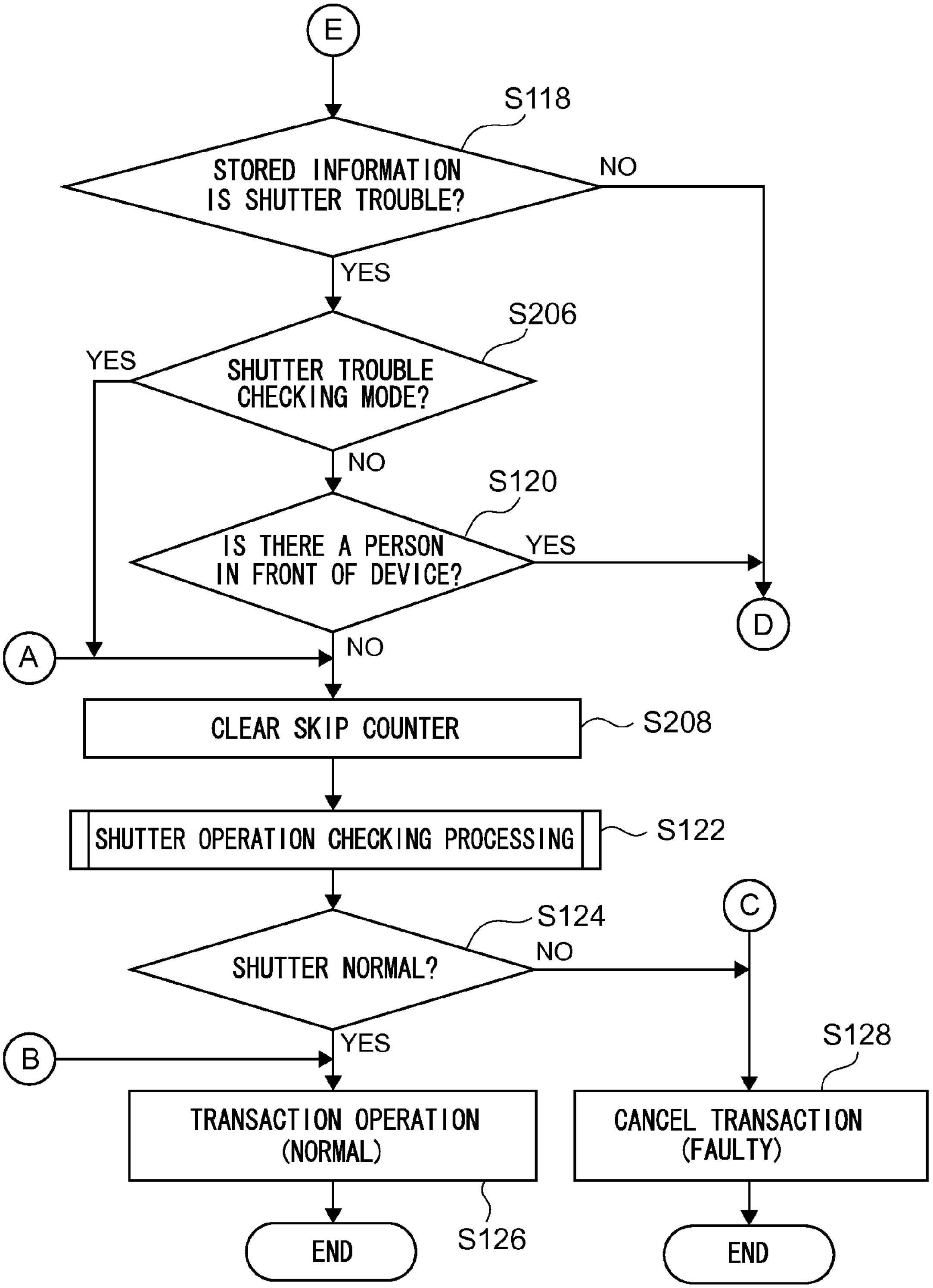
FIG. 9 is a flowchart showing the example of operation of the automatic transaction device 10 at the time of the resetting processing relating to the second embodiment.
Figure 10:
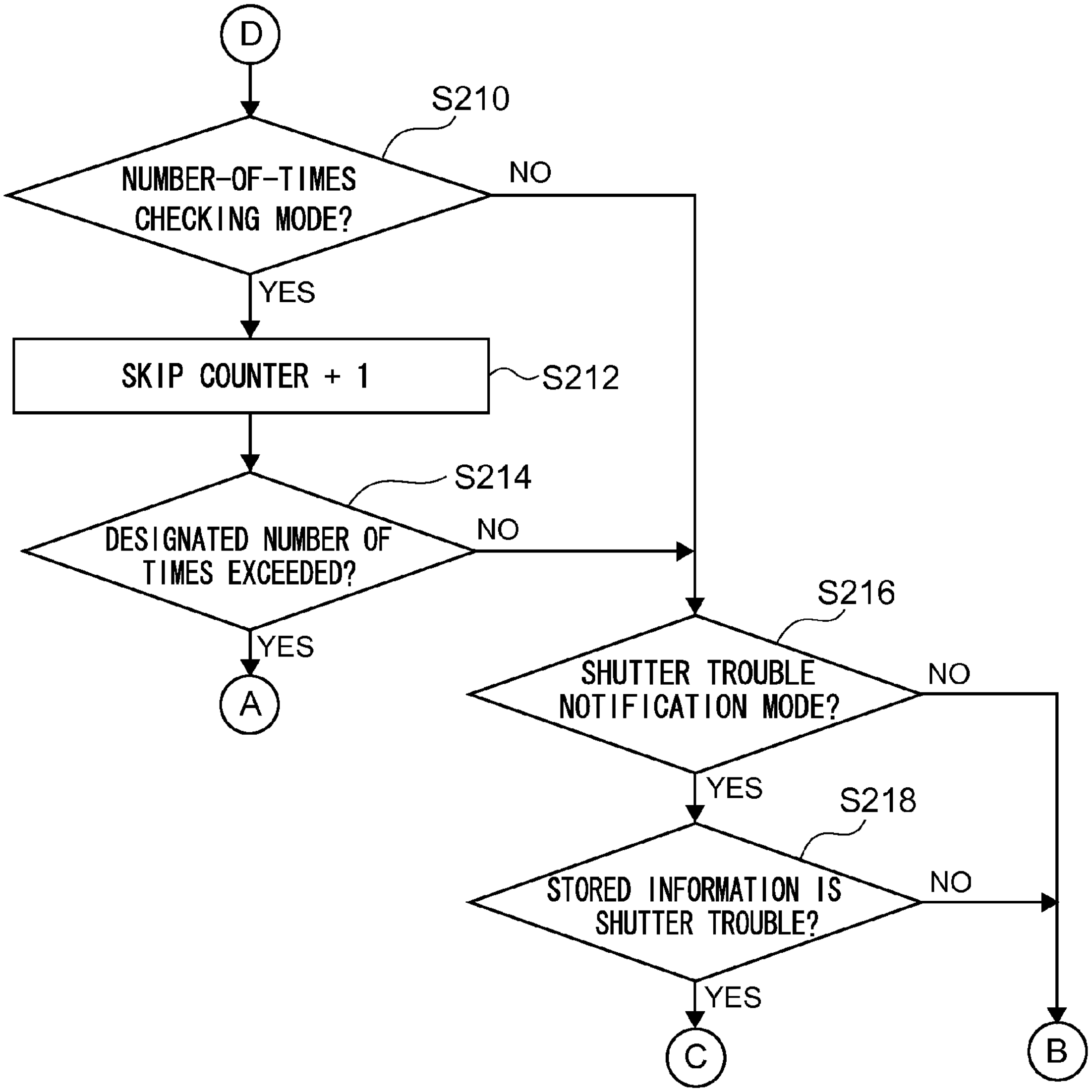
FIG. 10 is a flowchart showing the example of operation of the automatic transaction device 10 at the time of the resetting processing relating to the second embodiment.

An example of operation of the automatic transaction device 10 at the time of resetting processing is described with reference to FIG. 8 through FIG. 10. FIG. 8 through FIG. 10 are flowcharts showing an example of operation of the automatic transaction device 10 at the time of the resetting processing relating to the second embodiment.

In the following description, explanation centers on portions that differ from the flowchart of FIG. 5. The processings of steps S102 through S116 are substantially similar to FIG. 5. In the second embodiment, in a case in which it is judged in step S110 or step S116 that no bills remain in the customer interface opening 18 (No), the control device 122 judges whether or not the set operation mode is the mode in which shutter operation checking processing is carried out invariably (step S202).

If it is judged in step S202 that the set operation mode is the mode in which checking processing is carried out invariably (Yes), the control device 122 clears a Skip counter (step S208), and executes the shutter operation checking processing (step S122). This shutter operation checking processing is the processing shown in the flowchart of above-described FIG. 6.

If it is judged in step S202 that the set operation mode is not the mode in which checking processing is invariably carried out (No), the control device 122 judges whether or not it falls within the designated time in which checking processing is carried out (step S204). This designated time is set in advance. If it is judged in step S204 that it falls within the designated time (Yes), the control device 122 executes the shutter operation checking processing (steps S208, S122).

If it is judged in step S204 that it does not fall within the designated time (No), the control device 122 judges whether or not the trouble information stored in step S102 is information relating to trouble with the shutter 19 (step S118). Further, if it is judged in step S118 that the trouble information is information relating to trouble with the shutter 19 (Yes), the control device 122 judges whether or not the set operation mode is the shutter trouble checking mode (step S206).

If it is judged in step S206 that the set operation mode is the shutter trouble checking mode (Yes), shutter operation checking processing is executed (steps S208, S122) without judging whether or not there is a person in front of the device.

If it is judged in step S118 that the trouble information is not information relating to trouble with the shutter 19 (No), or if it is judged in step S120 that there is a person in front of the device (Yes), the control device 122 judges whether or not the set operation mode is the shutter operation number-of-times checking mode (step S210).

If it is judged in step S210 that the set operation mode is the number-of-times checking mode (Yes), the control device 122 clears the Skip counter (step S212), and judges whether or not the number of times that shutter operation was not executed has exceeded the designated number of times (step S214). Further, if it is judged in step S214 that the designated number of times has been exceeded (Yes), the control device 122 executes the shutter operation checking processing (steps S208, S122).

If it is judged in step S210 that the set operation mode is not the number-of-times checking mode (No), or if it is judged in step S214 that the designated number of times has not been exceeded (No), the control device 122 judges whether or not the set operation mode is a shutter trouble notification mode (step S216).

If it is judged in step S216 that the set operation mode is the shutter trouble notification mode (Yes), the control device 122 judges whether or not the trouble information stored in step S102 is information relating to trouble with the shutter 19 (step S218). Further, if it is judged in step 218 that the trouble information is information relating to trouble with the shutter 19 (Yes), the control device 122 cancels the transaction, and gives notice that there is trouble with the shutter (step S128).

On the other hand, if it is judged in step S218 that the trouble information is not information relating to trouble with the shutter 19 (No), or if it is judged in step S216 that the set operation mode is not the shutter trouble notification mode (No), the control device 122 executes the transaction (step S126).

In accordance with the above-described second embodiment, if the operation mode is a predetermined mode (any of the first mode through the fourth mode), the control device 132 forcibly carries out operation conformation processing of the shutter 19. By setting conditions for carrying out operation confirmation processing in accordance with the usage environment of the automatic transaction device 10 in this way, continuation of a state in which operation confirmation processing of the shutter 19 is not carried out can be prevented.

Although preferred embodiments of the present invention have been described above in detail with reference to the appended drawings, the present invention is not limited to these examples. It is clear that persons having ordinary skill in the technical field to which the present invention belongs could conceive of various changed examples or modified examples within the scope of the technical concept put forth in the claims. It will be understood that such changed examples and modified examples as well of course fall within the technical scope of the present invention.

Further, the transfer of bills, that serve as an example of cash, is carried out with a customer at the customer interface opening 18 in the above description, but the present invention is not limited to this. For example, the transfer of coins may be carried out at the customer interface opening 18.

Further, the respective steps in the processings at the above-described automatic transaction device 10 do not necessarily have to be processed in time sequence in the order in which they were described in the flowcharts. For example, the respective steps in the processings at the automatic transaction device 10 may be processed in an order different than the orders described in the flowcharts, or may be processed in parallel.

Further, a computer program for causing the hardware, such as a CPU, a ROM, a RAM and the like that are incorporated within the automatic transaction device 10, to exhibit functions that are equivalent to those of the respective structures of the above-described automatic transaction device 10, also can be created.

The invention claimed is:

1. An automatic transaction device that carries out transactions relating to cash, comprising:
- a transfer opening at which transfer of cash is carried out;
- an opening/closing member that, by moving, can open and close the transfer opening;
- an opened/closed sensing section that senses an open/closed state of the opening/closing member; and
- a control section that, at a time of a resetting operation that instructs respective devices of the automatic transaction device to initialize, opens and closes the opening/closing member and carries out operation confirmation processing, and, after the operation confirmation processing, causes the open/closed state of the opening/closing member to be sensed, and, if it is judged that the open/closed state is abnormal, continues a cancelled state of the transaction.

2. The automatic transaction device of claim 1, further comprising a cash sensing section that senses cash of the transfer opening,
- wherein, in a case in which it is sensed that cash remains in the transfer opening, the control section does not carry out the operation confirmation processing.

3. The automatic transaction device of claim 1, further comprising a cash processing section that takes-in, into a device interior, cash of the transfer opening,
- wherein the control section carries out the operation confirmation processing after taking-in of the cash into the device interior.

4. The automatic transaction device of claim 1, further comprising an acquiring section that acquires trouble information relating to trouble that has arisen at the automatic transaction device,
- wherein the control section
- carries out the operation confirmation processing if the acquired trouble information expresses trouble with the opening/closing member, and
- does not carry out the operation confirmation processing if the trouble information expresses trouble other than trouble with the opening/closing member.

5. The automatic transaction device of claim 1, further comprising a person sensing section that senses existence of a person in a vicinity of the automatic transaction device,
- wherein the control section does not carry out the operation confirmation processing if it is sensed that there is a person in the vicinity.

6. The automatic transaction device of claim 1, further comprising a mode setting section that sets an operation mode of the automatic transaction device,
- wherein the control section carries out the operation confirmation processing if a set operation mode is a predetermined mode.

7. The automatic transaction device of claim 6, wherein the predetermined mode includes a mode that forcibly carries out the operation confirmation processing.

8. The automatic transaction device of claim 6, further comprising an acquiring section that acquires a number of times of non-execution of the operation confirmation processing,
- wherein the predetermined mode includes a mode that forcibly carries out the operation confirmation processing if the number of times of non-execution exceeds a predetermined number of times.

9. The automatic transaction device of claim 6, wherein the predetermined mode includes a mode that forcibly carries out the operation confirmation processing if the resetting operation has been carried out within a predetermined time that is set in advance.

10. The automatic transaction device of claim 6, wherein the predetermined mode includes a mode that confirms trouble with the opening/closing member.

11. The automatic transaction device of claim 6, further comprising an acquiring section that acquires trouble information relating to trouble that has arisen at the automatic transaction device,
- wherein the control section gives notice of trouble with the opening/closing member if the acquired trouble information expresses trouble with the opening/closing member and the control section does not carry out the operation confirmation processing.

12. An automatic transaction method that carries out transactions relating to cash by an automatic transaction device, the method comprising:
- a step of, at a time of a resetting operation that instructs respective devices of the automatic transaction device to initialize, opening and closing an opening/closing member that can open and close a transfer opening at which transfer of cash is carried out, and carrying out operation confirmation processing;
- a step of sensing an open/closed state of the opening/closing member after the operation confirmation processing; and
- a step of continuing a cancelled state of the transaction if it is judged that the open/closed state is abnormal.

13. The automatic transaction method of claim 12, further comprising sensing the open/closed state of the opening/closing member at a time of dispensing.

* * * * *